United States Patent
Harada et al.

(10) Patent No.: US 9,696,732 B2
(45) Date of Patent: Jul. 4, 2017

(54) VALVE DEVICE HAVING PASSAGE DEFINING MEMBER HOLDING RESTRICTOR BODY WITHOUT CONNECTION PORTION

(71) Applicant: DENSO CORPORATION, Kariya, Aichi-pref. (JP)

(72) Inventors: Hiroyuki Harada, Kariya (JP); Yuichiro Miura, Kariya (JP); Hirofumi Onodera, Kariya (JP); Kimio Uchida, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/157,659

(22) Filed: May 18, 2016

(65) Prior Publication Data

US 2016/0370812 A1 Dec. 22, 2016

(30) Foreign Application Priority Data

Jun. 18, 2015 (JP) .................................. 2015-123357

(51) Int. Cl.
| | |
|---|---|
| *F16K 31/122* | (2006.01) |
| *G05D 16/10* | (2006.01) |
| *F16K 31/06* | (2006.01) |
| *F02M 25/08* | (2006.01) |
| *G05D 16/20* | (2006.01) |

(52) U.S. Cl.
CPC ....... *G05D 16/106* (2013.01); *F02M 25/0836* (2013.01); *F16K 31/06* (2013.01); *F16K 31/1221* (2013.01); *F16K 31/1226* (2013.01); *G05D 16/103* (2013.01); *G05D 16/2086* (2013.01); *F02M 25/0854* (2013.01)

(58) Field of Classification Search
CPC ... G05D 16/106; F16K 31/06; F16K 31/1221; F16K 31/1226; F02M 25/0836; F02M 25/0854
USPC ................... 251/129.15, 123, 124, 120, 118
See application file for complete search history.

(56) References Cited

U.S. PATENT DOCUMENTS

| | | | | |
|---|---|---|---|---|
| 4,512,548 A * | 4/1985 | Keller | ..................... | F16K 47/02 181/269 |
| 7,753,066 B2 * | 7/2010 | Passos et al. | ........... | F23N 1/002 137/10 |
| 8,500,086 B2 * | 8/2013 | Kratzer | ................... | B60T 8/363 251/129.02 |
| 2005/0217734 A1 | 10/2005 | Takakura | | |
| 2015/0027571 A1 | 1/2015 | Kishi et al. | | |
| 2015/0059711 A1 | 3/2015 | Kishi | | |

* cited by examiner

*Primary Examiner* — Kevin Lee (57) ABSTRACT

A valve device includes a valve seat forming member, a case, a first O-ring, and a second O-ring. The valve seat forming member is fit into a passage defining and forms a valve seat. The case houses an electromagnetic solenoid and is connected to the passage defining member. The first O-ring is interposed between an inner circumferential surface of the passage defining member and an outer circumferential surface of the valve seat forming member. The first O-ring prohibits the fluid from flowing through a space between the passage defining member and the valve seat forming member when the main valve body seats on the valve seat. The second O-ring is interposed between the case and the passage defining member. The second O-ring prohibits the fluid from flowing from the passage to an outside of the passage defining member.

2 Claims, 5 Drawing Sheets

SMALL OPENING DEGREE STATE

FIG. 3D

LARGE OPENING DEGREE STATE

PRESENT EMBODIMENT

FIG. 5B

COMPARATIVE EXAMPLE

FIG. 5C

PRESENT EMBODIMENT

FIG. 5D

COMPARATIVE EXAMPLE

VALVE DEVICE HAVING PASSAGE DEFINING MEMBER HOLDING RESTRICTOR BODY WITHOUT CONNECTION PORTION

CROSS REFERENCE TO RELATED APPLICATION

This application is based on reference Japanese Patent Application No. 2015-123357 filed on Jun. 18, 2015, the disclosure of which is incorporated herein by reference.

TECHNICAL FIELD

The present disclosure relates to a valve device, more specifically, to a valve device that selectively opens and closes a passage between a fuel tank and a canister.

BACKGROUND

Conventionally, there has been known a valve device with two valve bodies for selectively opening and closing a passage between a fuel tank and a canister in a vapored fuel processing device (e.g., refer to Patent Document 1: JP 2015-25488 A).

Such a valve device typically decreases an opening degree of the passage to prohibit a large amount of vapored fuel from flowing into the canister at once when a pressure in the fuel tank is relatively high, whereas the valve device typically increases the opening degree of the passage so that, to immediately decrease the pressure in the fuel tank, a large amount of the vapored fuel can flow toward the canister when the pressure in the fuel tank is relatively low.

In a configuration of Patent Document 1, the valve device includes a passage defining member, a main valve body, and a sub valve body, as described below.

A passage is defined in the passage defining member and fluid flows through the passage. The main valve body is housed in the passage and is operated by an electromagnetic solenoid to selectively open and close the passage.

The sub valve body is disposed in the passage downstream of the main valve body. The sub valve body is operated by a pressure difference, which is generated when the passage is opened, between a pressure at an upstream side of the sub valve body and a pressure at a downstream side of the sub valve body. The sub valve body decreases an opening degree of the passage as the pressure difference increases.

A valve seat is annually formed in the passage defining member and the main body seats on the valve seat. The valve seat has an inner circumferential surface forming a portion of the passage, and the passage is closed when the main valve body seats on the valve seat.

According to the valve device of Patent Document 1, a downstream side of the valve seat in the passage and the fuel tank are not in communication with each other when the main valve body seats on the valve seat and closes the passage.

Hence, since the sub valve body does not always expose to vapored fuel, it is possible to suppress occurrence of malfunction of the sub valve body due to adhesion of adhesive material to the sub valve body.

In the valve device of Patent Document 1, a portion of the passage defining member, more specifically, a cylindrical end portion close to the canister, is separately provided with a main body of the passage defining member in advance in order to set the sub valve body together with a return spring inside the passage. Then, the sub valve body and the return spring are housed inside the main body of the passage defining member, and thereafter the cylindrical end portion of the passage defining member is fit into the main body and is connected to the main body by welding. As a result, the sub valve body and the return spring are held with the main body and the cylindrical end portion to be set within the passage. Therefore, a connection portion is formed in the passage defining member, and thus strength of the passage defining member at the connection portion may be decreased.

SUMMARY

It is an object of the present disclosure to produce a valve device that allows a sub valve body to be set without forming the above-described connection portion having less strength in a passage defining member.

In an aspect of the present disclosure, a valve device includes a passage defining member, a main valve body, a sub valve body, a case, a valve seat forming member, an inner sealing member, and an outer sealing member.

The passage defining member defines therein a passage through which fluid flows. The main valve body is housed inside the passage. The main valve body is operated by an electromagnetic solenoid to selectively open and close the passage.

The sub valve body is disposed downstream of the main valve body inside the passage. The sub valve body is operated by a pressure difference, which is generated when the passage is opened, between a pressure at an upstream side of the sub valve body and a pressure at a downstream side of the sub valve body. The sub valve body decreases an opening degree of the passage as the pressure difference increases.

The valve seat is annually formed in the passage defining member, and the main valve body seats on the valve seat. The valve seat has an inner circumferential surface forming a portion of the passage. The passage is closed when the main valve body seats on the valve seat.

The valve seat forming member is fit into the passage defining member to be positioned downstream of the main valve body. The valve seat forming member forms the valve seat.

The case houses the electromagnetic solenoid and is connected to the passage defining member at a position upstream of the main valve body.

The inner sealing member is interposed between an inner circumferential surface of the passage defining member and an outer circumferential surface of the valve seat forming member. The inner sealing member prohibits the fluid from flowing through a space between the inner circumferential surface of the passage defining member and the outer circumferential surface of the valve seat forming member from an upstream side of the main valve body to a downstream side of the main valve body when the main valve body seats on the valve seat.

The outer circumferential sealing member is interposed between the case and the passage defining member. The outer circumferential sealing member prohibits the fluid from flowing from the passage to an outside of the passage defining member.

According to the aspect of the present disclosure, after setting the sub valve body and a return spring inside the passage, the sub valve body and the return spring can be held by the passage defining member and the valve seat forming member to be set inside the passage. Therefore, the sub valve body may be set without forming a connection portion that would have less strength in the passage defining member.

Furthermore, the inner sealing member is interposed between the inner circumferential surface of the passage defining member and the outer circumferential surface of the valve forming member, and the outer sealing member is interposed between the case and the passage defining member. Accordingly, a problem which would be generated when the valve seat forming member is fit into the passage defining member can be resolved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, an embodiment of the present disclosure will be described in detail. It is needless to say that the embodiment is one example of the present disclosure, and therefore the present disclosure is not limited to this embodiment.

With reference to FIGS. 1 to 3B, the configuration of a valve device 1 of the present embodiment will be described.

Figure 1:
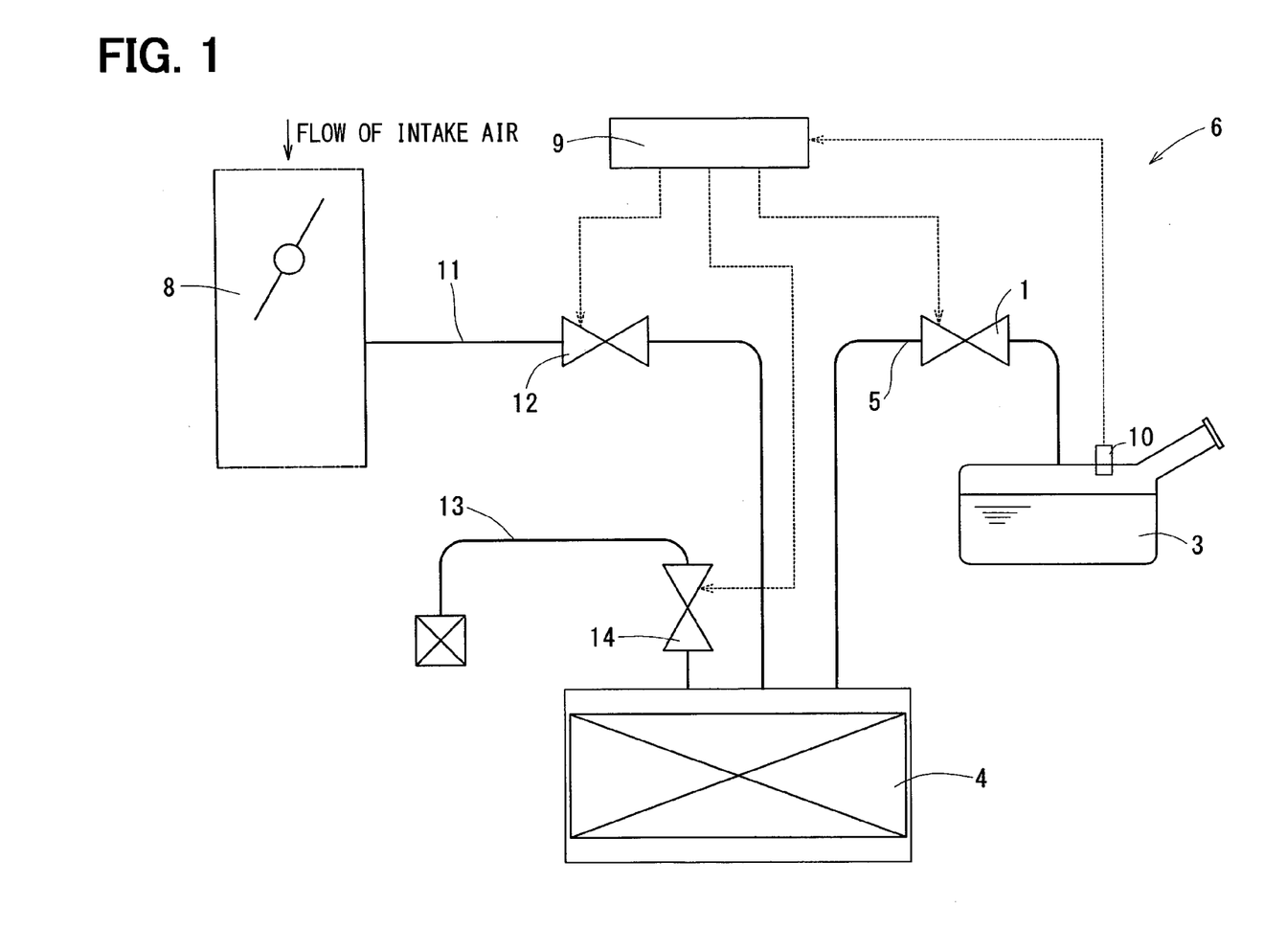
FIG. 1 is a diagram showing an entire configuration of a vapored fuel processing device.

The valve device 1 selectively opens and closes, for example, a vapored fuel passage 5 that guides vapored fuel generated in a fuel tank 3 toward a canister 4, and is configured to be one component of a vapored fuel processing device 6 installed in a vehicle.

As shown in FIG. 1, for example, the vapored fuel processing device 6 adsorbs and holds the vapored fuel of the fuel tank 3 by the canister 4. Then, the vapored fuel processing device 6 guides the vapored fuel held by the canister 4 toward an intake passage 8 of an internal combustion engine (not shown) to be purged during operation of the internal combustion engine.

A variety of electric powered components used in the vapored fuel processing device 6 are controlled by a controlling unit (hereinafter, referred to as an ECU 9) that controls the internal combustion engine.

Here, the fuel tank 3 stores liquid fuel, such as gasoline, and an upper space of the fuel tank 3 contains gaseous phase of the vapored fuel. A sensor 10 for detecting a pressure in the upper space is disposed in the fuel tank 3, and a detection value of the pressure is output to the ECU 9 and is used for controlling the electric powered components.

The canister 4 is a storage to store adhesive material (e.g., activated carbon) that holds the vapored fuel by adsorption. The canister 4 is connected to the upper space of the fuel tank 3 through the vapored fuel passage 5. The canister 4 is also connected to a negative pressure generating region of the intake passage 8 (more specifically, a downstream side of a throttle valve in an intake air flowing direction) through a purge passage 11.

A purge valve 12 is disposed in the purge passage 11 to selectively open and close the purge passage 11 and to adjust an opening degree of the purge passage 11.

The atmosphere can be introduced into the canister 4 through an atmospheric introducing passage 13, and an atmosphere introducing valve 14 is disposed in the atmospheric introducing passage 13.

Next, the valve device 1 will be described below.

Figure 2:
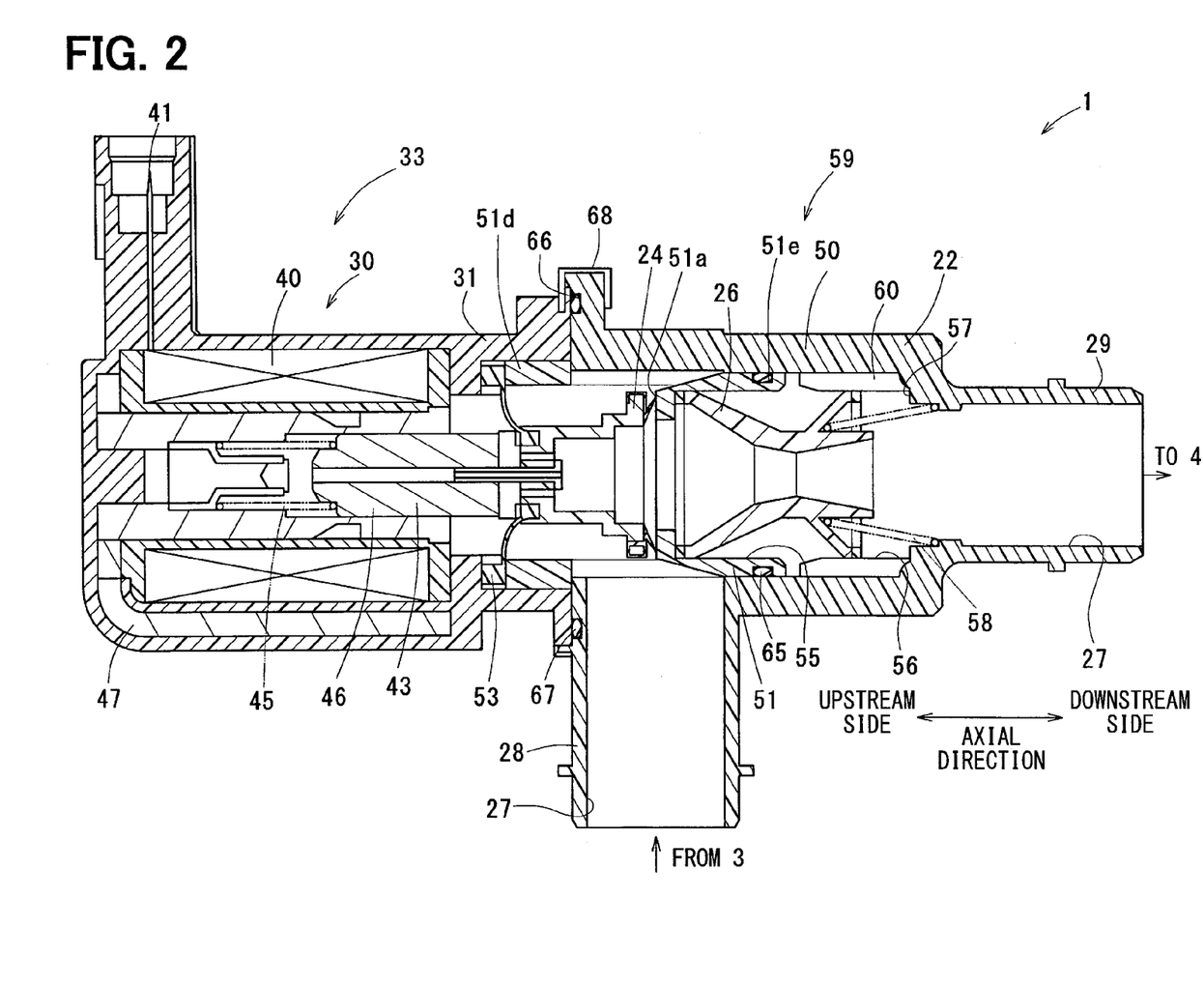
FIG. 2 is a diagram showing an entire configuration of a valve device.

The valve device 1 includes a passage defining member 22, a main valve body 24, and a restrictor body (hereinafter, referred to as a "sub valve body 26 ").

The passage defining member 22 defines therein a portion (hereinafter, referred to as a passage 27) of the vapored fuel passage 5, through which fluid flows in an L-shaped curved manner.

The passage defining member 22 includes an inlet pipe 28, to which a pipe from the fuel tank 3 is connected, and an outlet pipe 29, to which a pipe from the canister 4 is connected.

The main valve body 24 forms, together with an electromagnetic solenoid 30 and a case 31, an electromagnetic valve 33.

The case 31 houses the electromagnetic solenoid 30 and is connected to the passage defining member 22 at an upstream side of the main valve body 24.

The electromagnetic valve 33 is a closing valve to seal the fuel tank 3 with respect to the canister 4 when the electromagnetic valve 33 is closed. The electromagnetic valve 33 is a normally closed type valve that is opened when energized.

The main valve body 24 is formed to have a cylindrical shape with a bottom surface. The main valve body 24 is housed inside the passage 27 and selectively opens and closes the passage 27.

The electromagnetic solenoid 30 causes the main valve body 24 to open by an electromagnetic attraction force generated when energized.

The electromagnetic solenoid 30 includes a solenoid coil 40 that generates magnetic flux around the solenoid coil 40 when energized, a connector 41 to connect the solenoid coil 40 to the ECU 9, an armature 43 made of magnetic metal, a return spring 45 that biases the armature 43 and the main valve body 24 in a closing direction.

A stator core 46 is disposed on an inner circumferential side of the solenoid coil 40 and generates a magnetic path. Furthermore, a yoke 47 is disposed on an outer circumferential side of the solenoid coil 40 and generates a magnetic path.

The stator core 46 and the yoke 47 are made of magnetic metal that is magnetized when the solenoid coil 40 is energized.

The sub valve body 26 is disposed in the passage 27 downstream of the main valve body 24.

The sub valve body 26 is operated by a difference pressure, which is generated when the main valve body 24 opens the passage 27, between a pressure at an upstream side of the sub valve body 26 and a pressure at a downstream side of the sub valve body 26. The sub valve body 26 decreases an opening degree of the passage 27 as the pressure difference increases.

The passage defining member 22 houses, coaxially with the outlet pipe 29, the main valve body 24 and the sub valve body 26.

In other words, the passage defining member 22 houses the main valve body 24 and the sub valve body 26, and a valve body housing 50 forming a portion of a passage wall of the passage 27 is disposed coaxially with the outlet pipe 29.

The inlet pipe 28 is open at a side surface of the valve body housing 50.

Hereinafter, a direction along which a center axis of the valve body housing 50 extends is referred to as an "axial direction". The axial direction is in parallel with a direction through which the vapored fuel flows.

A valve seat forming member 51 having a cylindrical form is disposed inside the valve body housing 50 between the main valve body 24 and the sub valve body 26.

An annular valve seat 51a is formed in the valve seat forming member 51. The valve seat 51a is a seat on which the main valve body 24 seats and the valve seat 51a has an inner circumferential surface forming a portion of the passage 27.

The passage 27 is closed when the main valve body 24 seats on the valve seat 51a.

An outer circumferential edge of a cylindrical diaphragm 53 made of resin is interposed between an upstream end of the valve seat forming member 51 and the case 31. The diaphragm 53 has an inner circumferential edge that is interposed between the main valve body 24 and the armature 43 so that the diaphragm 53 serves as a partition member that prevents the vapored fuel introduced into the passage 27 from flowing toward the electromagnetic solenoid 30.

An opening is formed on a side surface of the valve seat forming member 51 to introduce the vapored fuel supplied from the inlet pipe 28 into the valve seat forming member 51.

A guide surface 55 is formed on an inner circumferential surface of one end side of the valve seat forming member 51 to slidably support the sub valve body 26. The guide surface 55 slidably supports the sub valve body 26 together with guide surfaces 56 formed in the valve body housing 50, which are described below.

The sub valve body 26 will be described in detail below.

The sub valve body 26 forms, together with a valve seat 57 and a return spring 58, a two-step switching valve 59 that is operated by a pressure difference of fluid.

The valve seat 57 is annually formed at a downstream end of the guide surfaces 56 in the valve body housing 50.

The sub valve body 26 is supported on an upstream side of the valve seat 57 and is slidable along the axial direction thereof. The sub valve body 26 is biased by a pressure of fluid on an upstream side of the sub valve body 26 toward a downstream side of the sub valve body 26.

The return spring 58 biases the sub valve body 26 toward the upstream side of the sub valve body 26.

Figure 3A:
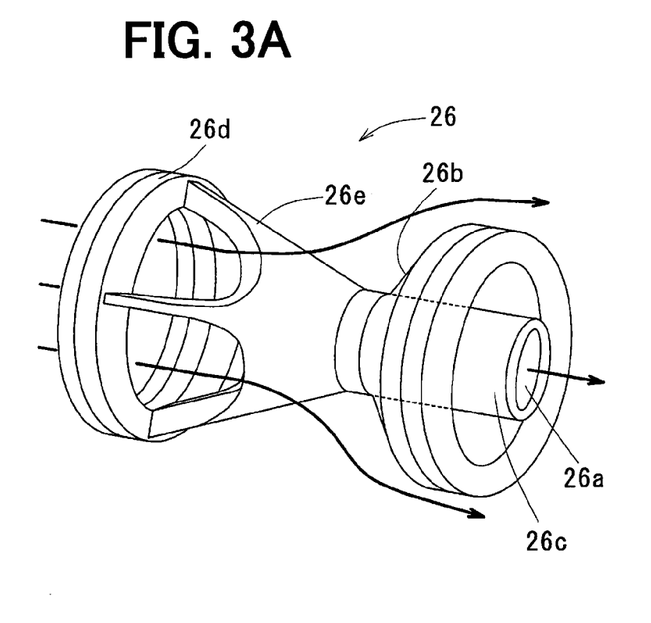
FIG. 3A is an explanatory diagram of a sub valve body.

As shown in FIG. 3A, the sub valve body 26 includes a through hole 26a that allows fluid to flow therethrough between the upstream side and the downstream side of the sub valve body 26 even when the sub valve body seats on the valve seats 57. The sub valve body 26 is slidably supported by and in contact with the guide surfaces 56.

The sub valve body 26 includes a valve portion 26b, a cylinder 26c, an upstream guide 26, and a plurality of leg portions 26e.

The valve portion 26b is a portion to selectively open and close the passage 27. The valve portion 26b receives a biasing force due to a pressure of fluid and a pressure of the return spring 58 from an upstream side of the valve portion 26b.

An upstream portion of the valve portion 26b is tapered to have a conical shape that has a diameter gradually increasing from an upstream side toward a downstream side of the valve portion 26b. An upstream side surface of the valve portion 26b mainly receives a pressure of fluid from the upstream side of the valve portion 26b.

A downstream side of the valve portion 26b has a cylindrical shape, and a seat portion made of resin is disposed in a downstream end of the downstream side of the valve portion 26b. An outer circumferential surface of the downstream side of the valve portion 26b is in slide contact with the guide surfaces 56. The guide surfaces 56 are disposed in the valve body housing 50 between the downstream end of the valve seat forming member 51 and the valve seat 57. More specifically, the guide surfaces 56 are disposed on inner circumferential end surfaces of a plurality of ribs 60 protruding radially inward of the valve body housing 50 from an inner circumferential wall of the valve body housing 50. Each of spaces formed between the neighboring ribs 60 in a circumferential direction serves as a bypass passage through which fluid flows around the valve portion 26b when the sub valve body 26 moves toward the upstream side.

The cylinder 26c is disposed at a root portion of the valve portion 26b and extends from the root portion along the axial direction of the sub valve body 26. The through hole 26a passes through the center of the valve portion 26b and the cylinder 26c. The through hole 26a may be formed as a de Laval nozzle (see FIG. 2).

The upstream guide 26d is cylindrically shaped on an upstream side of the valve portion 26b and is slidably supported by the guide surface 55. The valve portion 26b and the upstream guide 26d are connected to each other through a plurality of leg portions 26e.

It should be noted that a seat made of resin is also disposed in an upstream end of the upstream guide 26d.

Figure 3B:
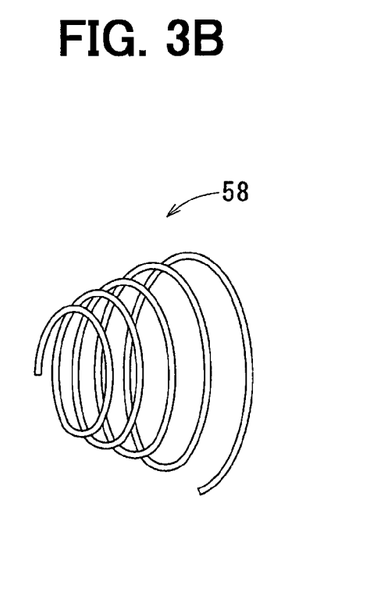
FIG. 3B is a diagram showing a return spring.

As shown in FIG. 3B, the return spring 58 is a compressed coil wound to have a substantially conical shape. The return spring 58 is disposed, in a compressed manner, in a space between a spring seat formed on a passage wall downstream of the valve seat 57 and a spring seat formed in the sub valve body 26. The spring seat of the sub valve body 26 is disposed in a root portion of the cylinder 26c.

Figure 3C:
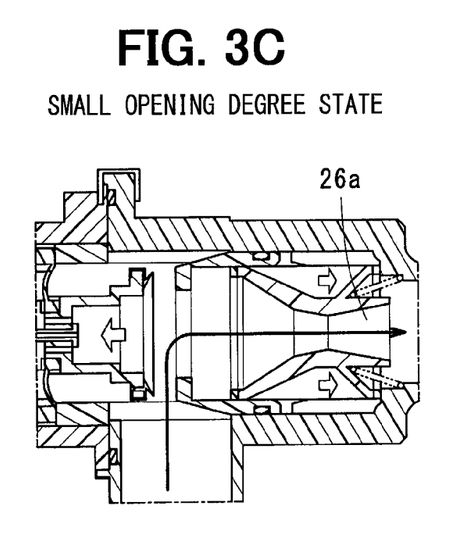
FIG. 3C is a diagram showing the valve device in a small opening degree state.
Figure 3D:
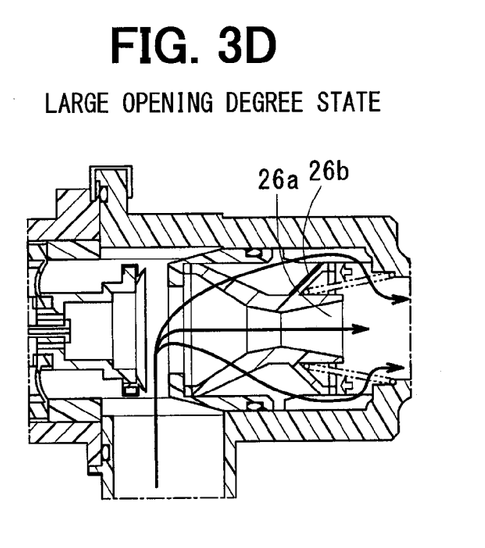
FIG. 3D is a diagram showing the valve deice in a large opening degree state.

The above-described two-step switching valve 59 switches between a large opening degree state and a small opening degree state, as shown in FIGS. 3C and 3D.

As shown in FIG. 3D, the large opening degree state is defined as a state where the valve portion 26b separates from the valve seat 57 and where fluid flows through both an outer circumferential side space of the valve portion 26b and the through hole 26a. As shown in FIG. 3C, the small opening degree state is defined as a state where the valve portion 26b contacts on the valve seat 57 and where fluid flows through only the through hole 26a.

When the electromagnetic valve 33 is opened, a pressure inside the fuel tank 3 becomes high and a pressure of fluid applied to the valve portion 26b from the upstream side of the valve portion 26b becomes high. Therefore, the valve portion 26b seats on the valve seat 57 to be in the small opening degree state.

In contrast, when a pressure inside the fuel tank 3 is low and a pressure of fluid applied to the valve portion 26b from the upstream side of the valve portion 26b is low, the valve portion 26b separates from the valve seat 57 to be in the large opening degree state.

As show in FIG. 2, the valve seat forming member 51 is fit into the passage defining member 22 and a flange 51d formed in an upstream side end of the valve seat forming member 51 is held and interposed between the case 31 and the valve body housing 50.

A circumferential groove 51e is formed on the outer circumferential surface of the valve seat forming member 51 at a position downstream of the valve seat 51a.

The valve seat forming member 51 is fit into the valve body housing 50 while an O-ring 65 as an inner sealing member is being fit into the circumferential groove 51e.

Figure 5A:
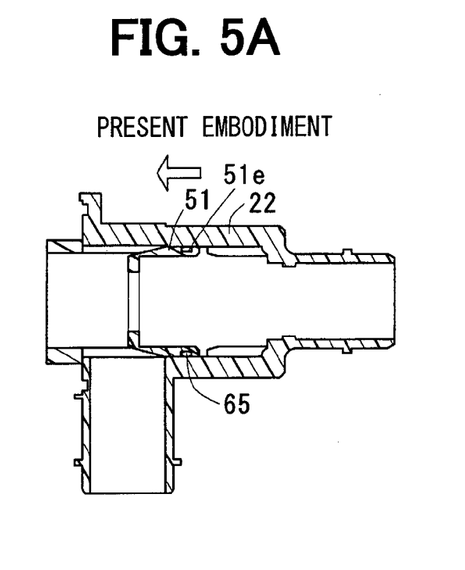
FIG. 5A is a diagram showing the valve device according to the embodiment.

Accordingly, the O-ring 65 is interposed between the inner circumferential surface of the passage defining member 22 and the valve seat forming member 51 (see FIG. 5A).

As a result, a space between the inner circumferential surface of the passage defining member 22 and the valve seat forming member 51 is filled with the O-ring 65.

Therefore, when the main valve body 24 seats on the valve seat 51a, fluid can be prohibited from flowing through a radially extending space between the inner circumferential surface of the passage defining member 22 and the outer circumferential surface of the valve seat forming member 51 from the upstream side to the downstream side of the main valve body 24.

An annual groove 66 is formed in the passage defining member 22 between the case 31 and the passage defining member 22.

The annual groove 66 is a groove that is formed to surround the passage 27 formed in the upstream end of the valve body housing 50.

An O-ring 67 as an outer sealing member is fit into the annual groove 66, and then the O-ring 67 is interposed between the case 31 and the passage defining member 22 by fixing the case 31 and the passage defining member 22 to each other by means of an annular cramp 68.

Accordingly, fluid can be prohibited by the O-ring 67 from flowing from the passage 27 to an outside of the passage defining member 22.

The valve seat forming member 51 is fit into the passage defining member 22 to be positioned downstream of the main valve body 24 and forms the valve seat 51a.

The case 31 houses the electromagnetic solenoid 30 and is connected to the passage defining member 22 on an upstream side of the main valve body 24.

The O-ring 65 is interposed between the inner circumferential surface of the passage defining member 22 and the valve seat forming member 51.

Then, when the main valve body 24 seats on the valve seat 51a, the O-ring 65 prohibits fluid from flowing through the space between the inner circumferential surface of the passage defining member 22 and the outer circumferential surface of the valve seat forming member 51 from the upstream side to the downstream side of the main valve body 24.

Thus, after the sub valve body 26 and the return spring 58 are housed inside the passage 27, the sub valve body 26 and the return spring 58 can be set in the passage 27 by being held with the passage defining member 22 and the valve seat forming member 51. Hence, there is no need to separately provide the outlet pipe 29 with the main body of the passage defining member 22. As a result, it is possible to set the sub valve body 26 without forming the connection portion having less strength in the passage defining member 22.

The O-ring 67 is interposed between the case 31 and the passage defining member 22 and prohibits fluid from flowing from the passage 27 to an outside of the passage defining member 22.

Figure 4:
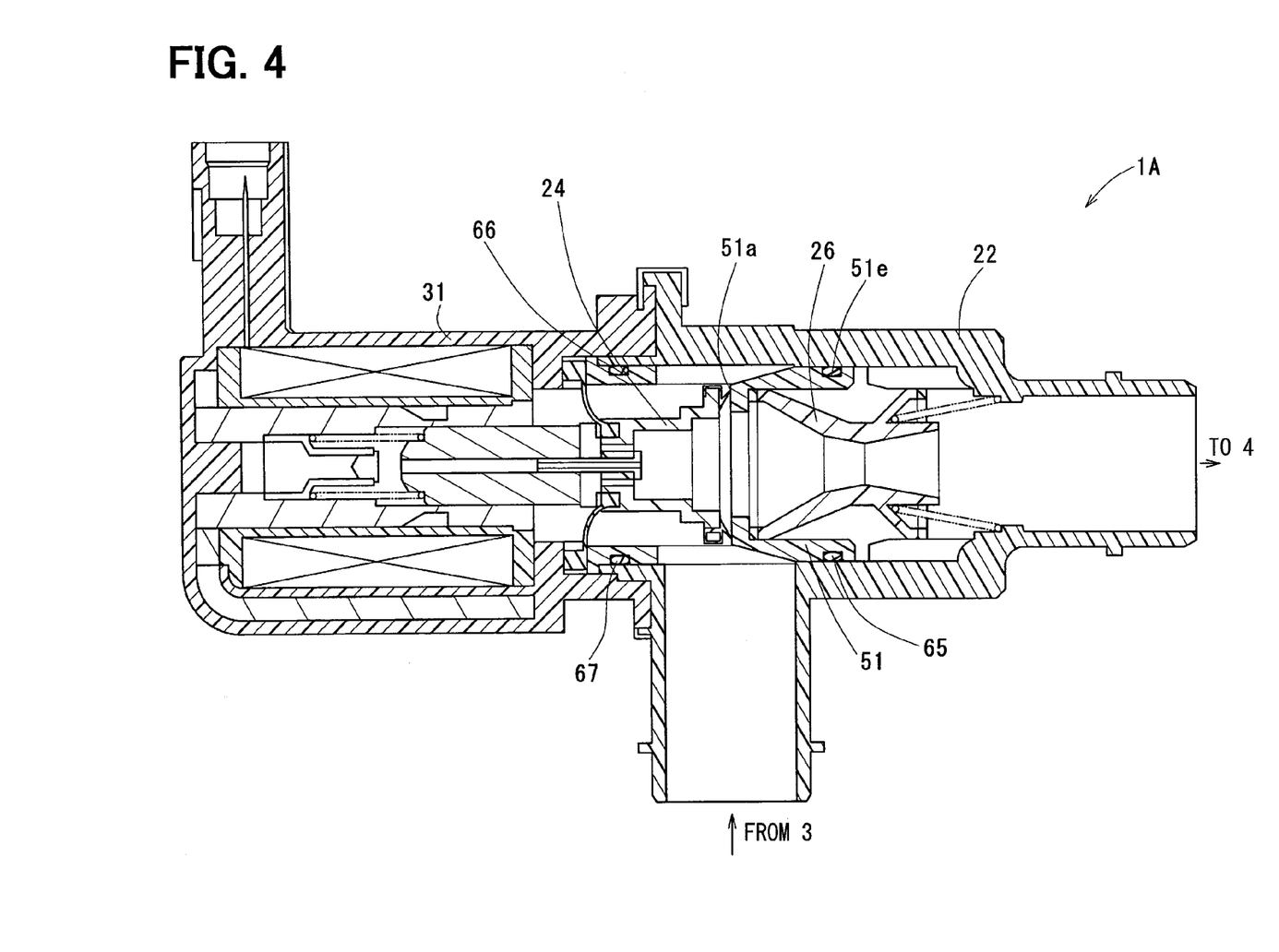
FIG. 4 is a diagram showing an entire configuration of a valve device according to a comparative example.

Here, FIG. 4 shows a comparative example of a valve device 1A.

In the valve device 1A of the comparative example, the same components as the embodiment are assigned with the same referential numerals.

In the valve device 1A, a circumferential groove 66 is formed on an outer circumferential surface of the valve seat forming member 51 upstream of the valve seat 51a.

The valve seat forming member 51 is fit into the passage defining member 22 while an O-ring 67 is fit into the circumferential groove 66.

Figure 5B:
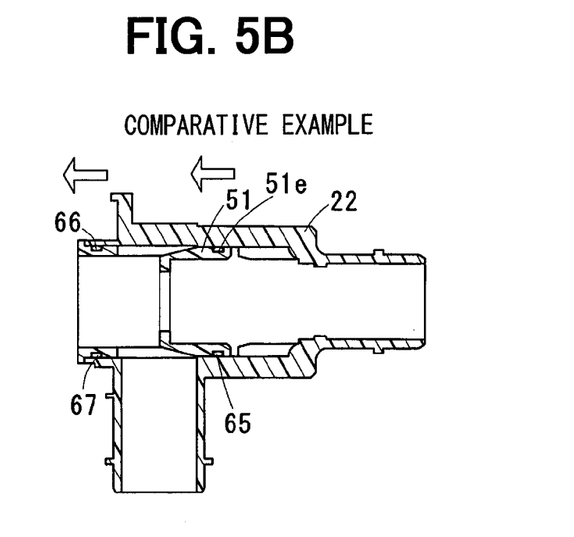
FIG. 5B is a diagram showing the valve device according to the comparative example.

That is, the valve seat forming member 51 of the valve device 1A is fit into the passage defining member 22 in a state where the O-ring 65 is set inside the circumferential groove 51e and the O-ring 67 is set inside the circumferential groove 66 (see FIG. 5B).

On the contrary, the valve seat forming member 51 of the embodiment, only the O-ring 65 is sat inside the circumferential groove 51e. Therefore, a less force for inserting the valve seat forming member 51 into the passage defining member 22 can be needed (see FIG. 5A).

Figure 5C:
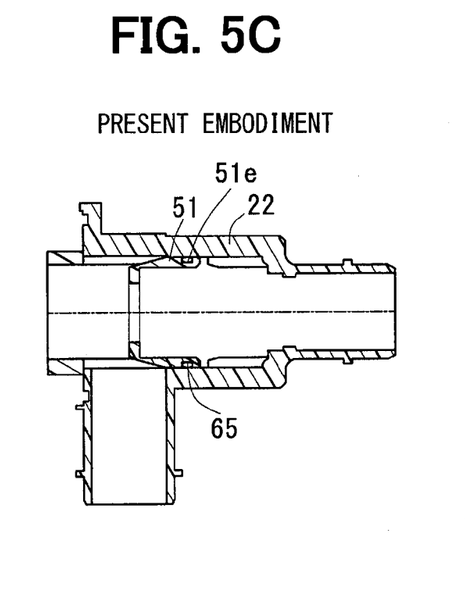
FIG. 5C is a diagram showing the valve device according to the embodiment.
Figure 5D:
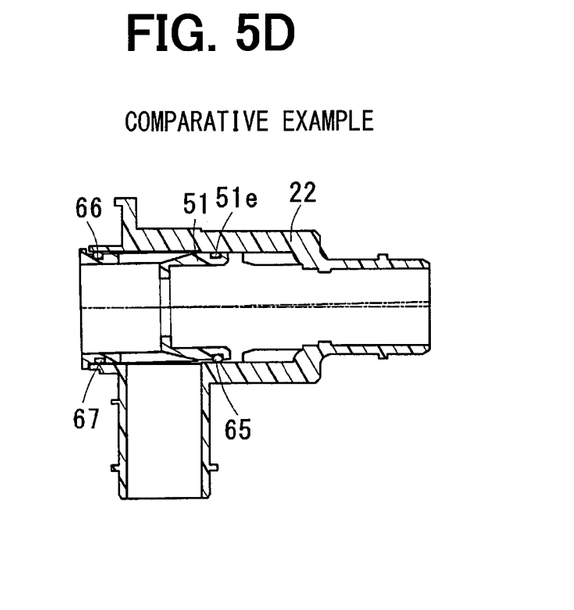
FIG. 5D is a diagram showing the valve device according to the comparative example where the valve seat forming member is angled relative to an axial direction of the passage defining member.

As a result, the valve seat forming member 51 can be less likely to be angled relative to the axial direction when the valve seat forming member 51 is fit into the passage defining member 22 (see FIGS. 5C and 5D).

Furthermore, since a force for inserting the valve seat forming member 51 into the passage defining member 22 can be reduced, the valve seat forming member 51 can be formed to be a thinner shape (see FIGS. 2 and 4).

Accordingly, the number of transfer paths for sound generated when the main valve body 24 seats on the valve seat 51a can be decreased, and therefore it is possible to suppress the sound transfer.

According to the present embodiment, the problem that would be generated when the valve seat forming member 51 is fit into the passage defining member 22 can be resolved by interposing and holding the O-ring 65 between the inner circumferential surface of the passage defining member 22 and the outer circumferential surface of the valve seat member 51 and by interposing and holding the O-ring 67 between the case 31 and the passage defining member 22.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:
1. A valve device comprising:
   a passage defining member that defines therein a passage through which fluid flows;
   a main valve body that is housed inside the passage, the main valve body being operated by an electromagnetic solenoid to selectively open and close the passage; and a restrictor body that is disposed downstream of the main valve body inside the passage, the restrictor body being operated by a pressure difference, which is generated when the passage is opened, between a pressure at an upstream side of the restrictor body and a pressure at a downstream side of the restrictor body, the restrictor body decreasing an opening degree of the passage as the pressure difference increases, wherein a valve seat is annually formed in the passage defining member, the main valve body seating on the valve seat, the valve seat has an inner circumferential surface forming a portion of the passage, and the passage is closed when the main valve body seats on the valve seat, wherein the valve device further comprises:
- a valve seat forming member that is fit into the passage defining member to be positioned downstream of the main valve body, the valve seat being formed in the valve seat forming member;
- a case that houses the electromagnetic solenoid and is connected to the passage defining member at a position upstream of the main valve body;
- an inner sealing member that is interposed between an inner circumferential surface of the passage defining member and an outer circumferential surface of the valve seat forming member, the inner sealing member prohibiting the fluid from flowing through a space between the inner circumferential surface of the passage defining member and the outer circumferential surface of the valve seat forming member from an upstream side of the main valve body to a downstream side of the main valve body when the main valve body seats on the valve seat; and
- an outer circumferential sealing member that is interposed between the case and the passage defining member, the outer circumferential sealing member prohibiting the fluid from flowing from the passage to an outside of the passage defining member.

2. The valve device according to claim 1, wherein the valve device is disposed in a vapored fuel passage that fluidly connects between a fuel tank installed in a vehicle and a canister holding vapored fuel.

* * * * *